US006760503B1

(12) United States Patent
Hermann

(10) Patent No.: US 6,760,503 B1
(45) Date of Patent: Jul. 6, 2004

(54) SCALABLE OPTICAL ROUTER/SWITCH AND METHOD OF CONSTRUCTING THEREOF

(76) Inventor: Eric F. Hermann, 74 River Dr., Ocean Ridge, FL (US) 33435

( * ) Notice: Subject to any disclaimer, the term of this patent is extended or adjusted under 35 U.S.C. 154(b) by 30 days.

(21) Appl. No.: 10/122,669

(22) Filed: Apr. 12, 2002

Related U.S. Application Data
(60) Provisional application No. 60/283,780, filed on Apr. 12, 2001.

(51) Int. Cl.[7] .............................. G02B 6/26; G02B 6/42; H04J 14/00
(52) U.S. Cl. .............................. 385/17; 385/16; 385/18; 398/48; 398/56; 398/57
(58) Field of Search .............................. 385/15–18, 22; 398/48–51, 56

(56) References Cited

U.S. PATENT DOCUMENTS

| | | | |
|---|---|---|---|
| 4,461,543 A | * 7/1984 | McMahon | ................... 359/320 |
| 4,988,157 A | 1/1991 | Jackel | |
| 5,408,556 A | * 4/1995 | Wong | ........................... 385/48 |
| 5,491,762 A | 2/1996 | Deacon | |
| 5,721,796 A | 2/1998 | de Barros | |
| 5,771,320 A | 6/1998 | Stone | |
| 5,864,643 A | * 1/1999 | Pan | ............................. 385/22 |
| 5,982,515 A | 11/1999 | Stone | |
| 6,072,923 A | 6/2000 | Stone | |
| 6,078,704 A | 6/2000 | Bischel | |
| 6,148,124 A | 11/2000 | Aksyuk | |
| 6,195,478 B1 | 2/2001 | Fouquet | |
| 6,208,778 B1 | 3/2001 | Donald | |
| 6,212,308 B1 | 4/2001 | Donald | |
| 6,215,921 B1 | 4/2001 | Lin | |
| 6,259,835 B1 | 7/2001 | Jing | |
| 6,275,626 B1 | * 8/2001 | Laor | ........................... 385/18 |
| 6,278,812 B1 | 8/2001 | Lin | |
| 6,301,403 B1 | 10/2001 | Heanue | |
| 6,320,994 B1 | 11/2001 | Donald | |
| 6,320,997 B1 | * 11/2001 | Dautartas et al. | ............. 385/19 |
| 6,324,316 B1 | 11/2001 | Fouquet | |
| 6,330,380 B1 | * 12/2001 | Young et al. | .................. 385/17 |
| 6,366,713 B1 | 4/2002 | Lin | |
| 6,597,829 B2 | * 7/2003 | Cormack | ...................... 385/22 |
| 2001/0031111 A1 | * 10/2001 | Irwin | ........................... 385/16 |
| 2002/0067877 A1 | * 6/2002 | Braun et al. | .................. 385/16 |
| 2002/0136486 A1 | * 9/2002 | Neukermans | ................ 385/22 |

OTHER PUBLICATIONS

WaveStar LambdaRouter, Intelligent All–Optical Cross–Connect: Lucent Technologies. http:www.lucent.com/press/1199/991109.nsa.html; pp 1–3.
Agilent Photonic Switching Platform, N3566A Dual 16×32 Photonic Switch; Agilent Technologies.

* cited by examiner

*Primary Examiner*—Brian Healy
*Assistant Examiner*—Tina M Lin
(74) *Attorney, Agent, or Firm*—Cohen, Pontani, Lieberman & Pavane

(57) ABSTRACT

A modular optical router/switch construction system and method are described. In one aspect of the present invention, the modules provided are basic 1×N optical components and/or pass-through 1×N optical components, both of which have input/output (I/O) ports which are capable of detachably interconnecting. Pass-through 1×N optical components are like the basic 1×N optical components but include extra ports so that input light may "pass through" the component. In another aspect of the present invention, a bi-directional optical component capable of modular construction is provided. The bi-directional optical component has the same I/O ports as the basic 1×N optical component, but the bi-directional I/O ports are built to engage a duplex optical link (i.e., a link comprised of two optical fibers with signals going in two opposite directions).

21 Claims, 12 Drawing Sheets

3D MEMS

2D MEMS

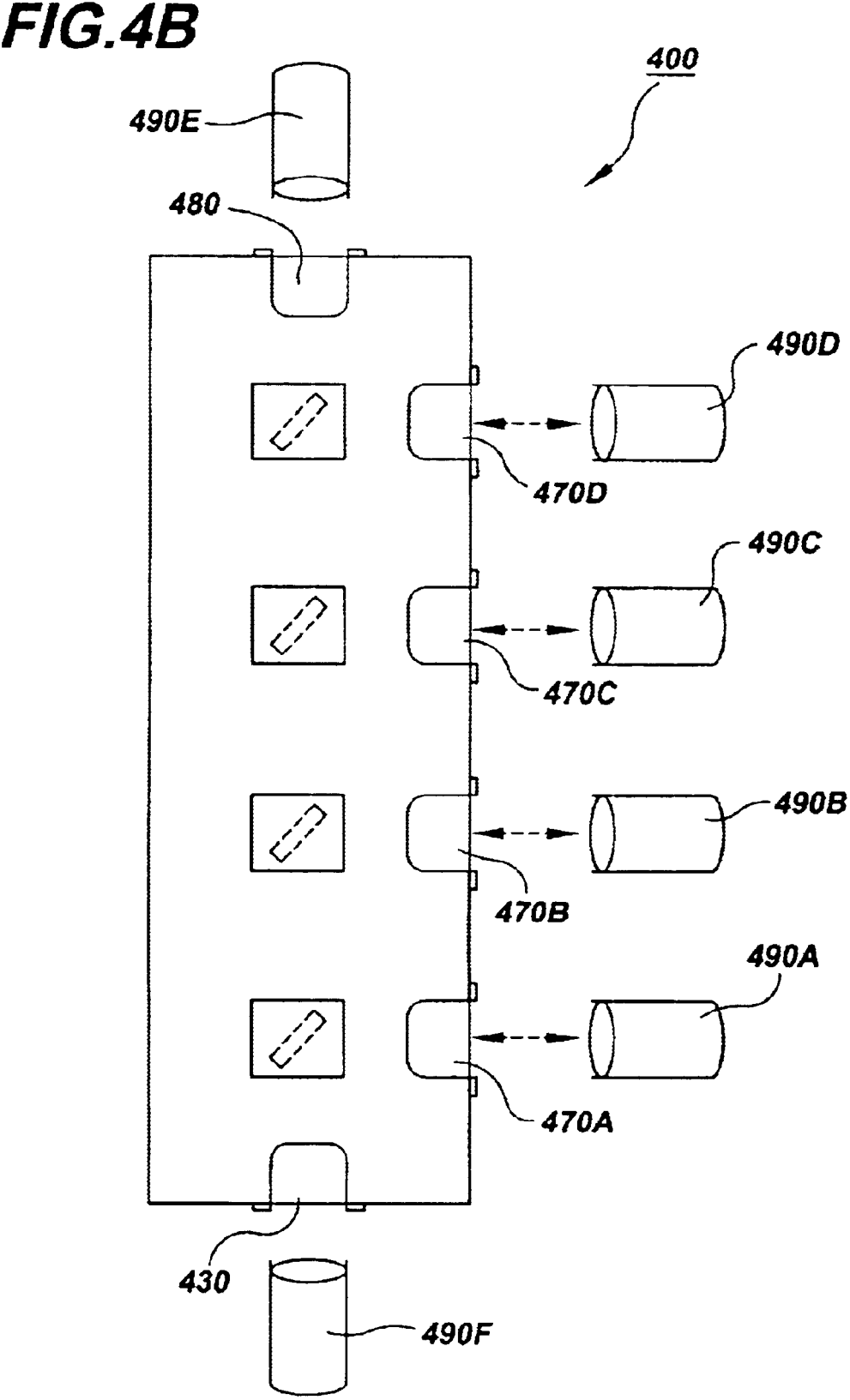

SCALABLE OPTICAL ROUTER/SWITCH AND METHOD OF CONSTRUCTING THEREOF

RELATED APPLICATIONS

This application claims priority from U.S. Provisional Patent Application Serial No. 60/283,780 which was filed on Apr. 12, 2001.

BACKGROUND OF THE INVENTION

1. Field of the Invention

The present invention relates to optical switches and, more particularly, to a method of constructing any arbitrary size scalable M×N optical router/switch using modular components, and to a bi-directional optical component capable of being used in such a system.

2. Description of the Related Art

The past twenty years has witnessed an optical revolution in telecommunications. The widespread deployment of optical fibers in order to carry light signals over long distances has vastly increased the communication capabilities of present telecommunications systems. However, although the communication pathways have been changed to an optical core, rather than an electrical one, the elements used for routing or switching the optical signals have mostly remained electrical. In practice, this means the optical light signal must be converted to an electrical signal, and this electrical signal is routed and/or switched by an electrical router/switch; then the electrical signal is converted back into an optical signal for transmission over an optical fiber. These optical-to-electrical and electrical-to-optical conversion steps are wasteful of both time and resources.

To solve this problem, many companies have offered optical routers which perform routing/switching completely in the optical domain, without converting the communication signals from optical to electrical, and vice-versa. Many technologies have been developed to provide such optical routing/switching. The first commercially available optical routing technology was mechanically based and limited to 1×2 and 2×2 port sizes. These are based on beam expanding collimators and/or electromagnetically (e.g., stepper motor or solenoid) actuated mirrors, prisms, or collimators. Waveguide routing technologies are also becoming available now: silica-on-silicon waveguide or photonic lightwave circuit (PLC) technology (based on thermally induced changes in the refractive index of silica), lithium niobate technology (based on electrically induced changes in the refractive index). But these technologies suffer from limited scalability, high insertion loss, and high crosstalk. Liquid crystal optical switches (based on changing the polarization of incident light and then using polarization analyzers to route the polarized light) are also being developed, but they are complex and only low port count switches (1×2 and 2×2) are currently available. Other optical routing technologies being developed include III-V semiconductor-based waveguide switches, polymer-based thermo-optic digital waveguide switches, and semiconductor optical amplifier (SOA)-based gate switches.

Micro-electromechanical systems (MEMS) are rapidly establishing itself as the most attractive technology for optical switching since it allows low-loss large-port-count optical switching solutions at the lowest cost per port. Basically, a MEMS device is a mechanical integrated circuit where the actuation forces required to move the parts may be electrostatic, electromagnetic, or thermal. The basic technology is based on establishing semiconductor processes for manufacturing highly accurate miniaturized parts and uses material with excellent mechanical and electrical properties (Si, SiOx, and SiNx). Silicon-based MEMS devices can be produced with different process technologies, including bulk micromachining, in which mechanical structures are etched in single crystal silicon, and surface micromachining, in which epitaxial layers of polysilicon, silicon nitride, and silicon oxide are deposited, patterned, and selectively removed.

U.S. Pat. No. 6,259,835 to Jing (which is hereby incorporated by reference) describes a 1×N MEMS optical switch with one primary port, a plurality of secondary ports, and a plurality of optical reflectors. Any one of the optical reflectors, which may comprise mirrors or prisms, can be moved by an actuator into position to reflect an input light beam out through a corresponding secondary port, i.e. to direct or route the signal to a destination. For example, FIG. 1 shows a switch with Input Fiber 101 engaged in Input Port 105, and a plurality of mirrors (e.g., Mirror 110) placed adjacent to a plurality of output ports (e.g., Output Port 120) in which output fibers are engaged. Input light beam 150 (indicated by the dotted line) comes from Input Port 105, reflects off of Mirror 110, and exits through Output Port 120. Since each output port has a corresponding mirror and actuator, the input light beam can be routed to any of the N output ports. If none of the mirrors is put in the path of the beam, the beam will reflect off of the last mirror (which is set in place) and exit out of the last output port.

Bubble technology can be used to route light signals instead of mirrors or prisms in optical routers. For example, in U.S. Pat. No. 6,320,994 to Donald et al. (which is hereby incorporated by reference), at least three waveguides (an input waveguide, and two output waveguides) intersect at a gap having a predetermined width. The gap is either filled with a fluid (whereby input light will exit through one output) or a bubble (whereby input light will exit through the other output) formed by heating the fluid. U.S. Pat. No. 6,324,316 to Fouquet et al. (which is hereby incorporated by reference) shows a 4×4 optical switch which uses bubble technology to route any of the four inputs to any of the four outputs. One shortcoming of Fouquet et al. is that, in most situations, if there are four input beams, at least one of these beams will cross at least one of the others after being reflected by a bubble. Although the interference caused by such interaction may be minimal, it is not non-existent (especially considering the beams are not orthogonal to each other), and such interference may become more problematic when technologies such as dense wavelength division multiplexing (DWDM) are used in combination with this switch.

Another problem with current optical routing technology is the lack of scalability, i.e., the inability for the technology to increase in size without becoming unduly complex. As examples, consider the two-dimensional MEMS cross-connect switch in FIG. 2A and the three-dimensional (3D) MEMS cross-connect switch in FIG. 2B. Both of these switches use mirrors. Mirror control for the 2D switch is binary and straightforward, but the trade-off for this simplicity is optical loss. Although the length of the light path only grows linearly with the number of input/output ports, the optical loss also grows rapidly due to the Gaussian nature of light. Because of this, 2D architectures are found to be impractical beyond 32 input and 32 output ports. Even though multiple stages of 32×32 2D switches could be put together to form a 1000-port 2D switch, the cumulative high optical losses make such an implementation impractical. By contrast, the 3D architecture of FIG. 2B greatly reduces the optical loss by making use of 3D space. In FIG. 2B, there are two banks of reflective mirrors which guide each light beam from any input port to any output port. Thus, there is a corresponding mirror for each of the input and output ports. Using this 3D architecture, switches with ports numbering in the thousands are possible. However, 3D architecture is complex, and becomes increasingly complex as the number of ports increases. Furthermore, such 3D optical switches are not modular in the sense that modular components can be added together to form larger routers. It makes more sense to simply built a larger 3D optical switch. But in such a large 3D optical switch, if only one mirror is out of alignment, or there is a problem with just a few mirrors, the entire switch must be taken out of service in order to fix it.

Even when conventional optical systems use modular components to construct an optical router, the resulting optical router is limited by other practical considerations. As an example, consider U.S. Pat. No. 5,771,320 to Stone (which is hereby incorporated by reference) which describes a modular system for building an optical routers. FIG. 3 shows two Stone modules 310 and 350 connected together to form an 8×8 optical router. Each module is a MUX/DEMUX, meaning that it can operate as a stacked demultiplexer (one input routed to one of many outputs) or a stacked multiplexer (one of many inputs to one output). Module 310 in FIG. 3 is operating as a stacked DEMUX, where each level of the stack has one input, such as light beam 300 entering the top level of the stack, and eight outputs. Within each layer, a series of switchable diffractive grating stages 320A–C routes an input beam to one of the eight output ports. The grating stages 320A–C are separated by distances varying by powers of two; thus, the distance between the input port (which is also the first grating stage 320A) and the second grating stage 320B is twice the distance between the second grating stage 320B and the third grating stage 320C. The number of stages is n, where the number of outputs is $2^n$. FIG. 3 shows all the possible lightpaths of incoming light beam 300 on the top level of DEMUX module 310; however, in practice, only one route would be taken through the level (leading to only one out of the eight outputs).

The complete stacked first (DEMUX) module 310 has 8 input ports and 64 output ports and its 64 output ports are attached to the input ports of the second module 350, which is a MUX with 64 input ports and 8 output ports. The second module, MUX 350, is the same as the first module, DEMUX 310, except that the second module is turned around (so that the output becomes the input) and rotated 90 degrees (so that the stacked vertical layers become horizontal slices). The resulting combination allows any of the eight input beams to exit through any of the eight output ports without any blocking.

Stone's optical router has limitations. First, because of the use of diffraction grating stages, the size of each layer increases exponentially as the number of outputs increase. Second, the number of inputs in each cubic module must be a power of 2 (i.e., $2^n$), and the number of outputs in each module must be $2^{2n}$, limiting the possible sizes of modules. Third, to route one input beam, all n diffractive grating stages of each level must be activated. Fourth, Stone's system is modular in only a limited sense, i.e., because each module can only be connected with modules of the same size and modules can not be put together to form larger modules (e.g., a 8×64 routing assembly can not be added to another 8×64 routing assembly to form a 16×128 routing assembly).

Therefore, there is a need for a system and method of building optical routers using modular components that are capable of constructing an optical router with any arbitrary number of input ports and output ports. Further, these modular components must be truly modular, i.e., they must be capable of interconnecting with other modules of any size. Further still, the modular components should be truly scalable, i.e., the size, complexity, and cost of the constructed optical router should not increase disproportionately as the number of I/O ports increase.

SUMMARY OF THE INVENTION

One object of the present invention is to provide a method of constructing an optical router with any arbitrary number of input ports and output ports from a plurality of optical components.

Another object of the present invention is to provide a modular optical router in which the router components can come in standard sizes, thereby reducing costs in the manufacturing of components and the building of modular optical routers.

Another object of the present invention is to provide a modular optical router construction method in which, if a portion of a modular optical router malfunctions or becomes defective, only the malfunctioning/defective optical component(s) will need to be replaced (instead of the entire router).

Yet another object of the present invention is to provide a modular optical router construction method which is truly scalable, i.e., the size, complexity, and cost of the constructed optical router should not increase disproportionately as the number of I/O ports increase.

These and other objects are achieved by the present invention which provides a modular optical router construction method in which the basic modules are a plurality of basic 1×N optical components which have input/output (I/O) ports which are capable of detachably interconnecting. In one aspect of the present invention, each of the basic 1×N optical components has a primary I/O port, N secondary I/O ports with a corresponding plurality of reflecting means, and a tertiary I/O port. Each reflecting means is either in an ON state or an OFF state. When in the ON state, the reflecting means either reflects a light beam to its corresponding secondary I/O port from the primary I/O port or reflects a light beam to the primary I/O port from its corresponding secondary I/O port. The tertiary I/O port is positioned so that any light beam input through the primary I/O port will be output through the tertiary I/O port if none of the reflecting means is in the ON state. The system and method may also use pass-through 1×N optical components, which are like the basic 1×N optical components but also include N quaternary I/O ports. Each quaternary I/O port has a corresponding secondary I/O port and is positioned such that any light beam input through the corresponding secondary I/O port will be output through the quaternary I/O port if none of the reflecting means is in the ON state.

In another aspect of the present invention, a bi-directional optical component capable of modular construction is provided. The bidirectional optical component has the same I/O ports as the basic 1×N optical component, but the bidirectional I/O ports are built to engage a duplex optical link (i.e., a link comprised of two optical fibers with signals going in two opposite directions). Furthermore, each secondary I/O port has a corresponding set of two reflecting means (one for each of the two directions of optical signal traffic).

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIG. 4B is a top elevation view of the inside of the basic modular optical component of FIG. 4A, but without the I/O Ports being engaged, according to a preferred embodiment of the present invention;

DETAILED DESCRIPTION OF THE PRESENTLY PREFERRED EMBODIMENTS

First, an exemplary basic 1×4 optical component is explained and described with reference to FIGS. 4A–D. Second, an exemplary 4×4 optical router constructed from eight of the exemplary basic 1×4 components is explained and described with reference to FIGS. 5A–B. Third, an exemplary pass-through 1×4 optical component is explained and described with reference to FIG. 6. Fourth, an exemplary 4×4 cross-connect switch constructed from four of the exemplary pass-through 1×4 optical components is explained and described with reference to FIG. 7. Fifth, another exemplary construction using different components (basic 1×16 optical components and repeaters) is explained and described with reference to FIG. 8. Sixth, a bi-directional optical component is explained and described with reference to FIG. 9. Lastly, some of the advantages of the present invention are listed.

FIGS. 4A–D are different views of a basic modular optical component according to a preferred embodiment of the present invention.

Figure 1:
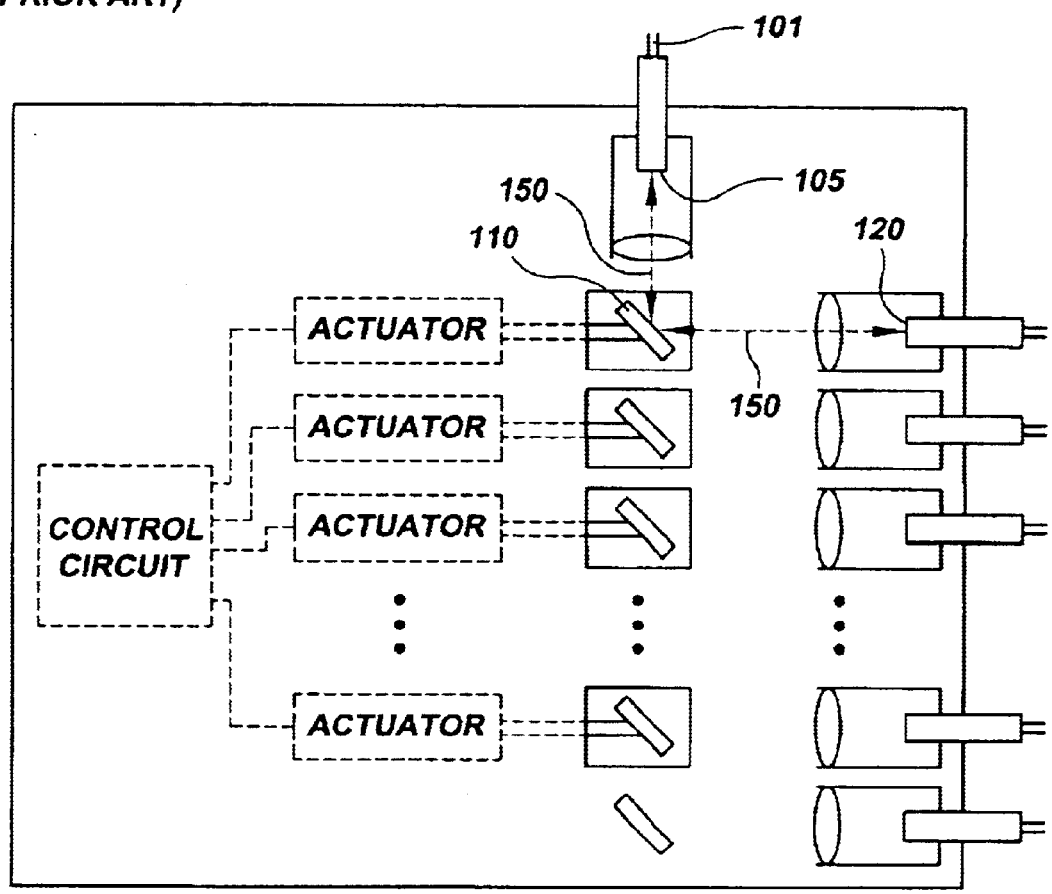
FIG. 1 is a diagram of a prior art 1×N MEMS optical switch.
Figure 2B:
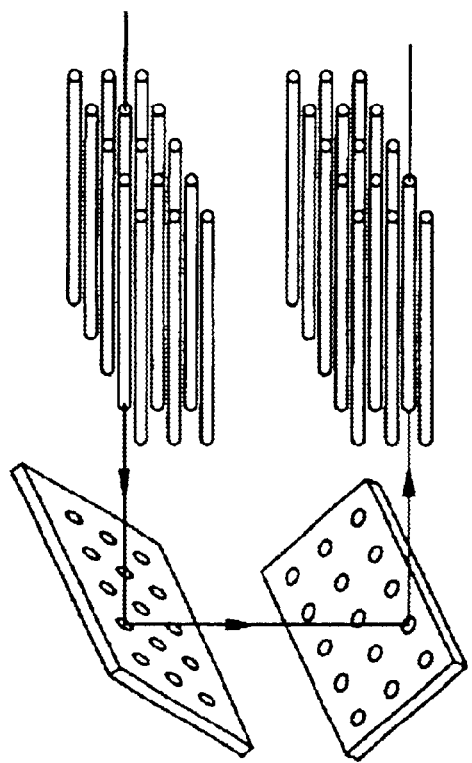
FIG. 2B is a diagram of a prior art optical switch with a three-dimensional (3D) architecture.
Figure 2A:
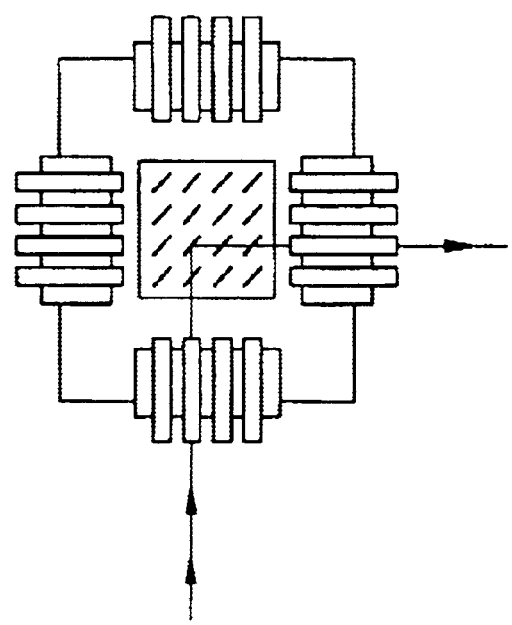
FIG. 2A is a diagram of a prior art optical switch with a two-dimensional (2D) architecture.
Figure 3:
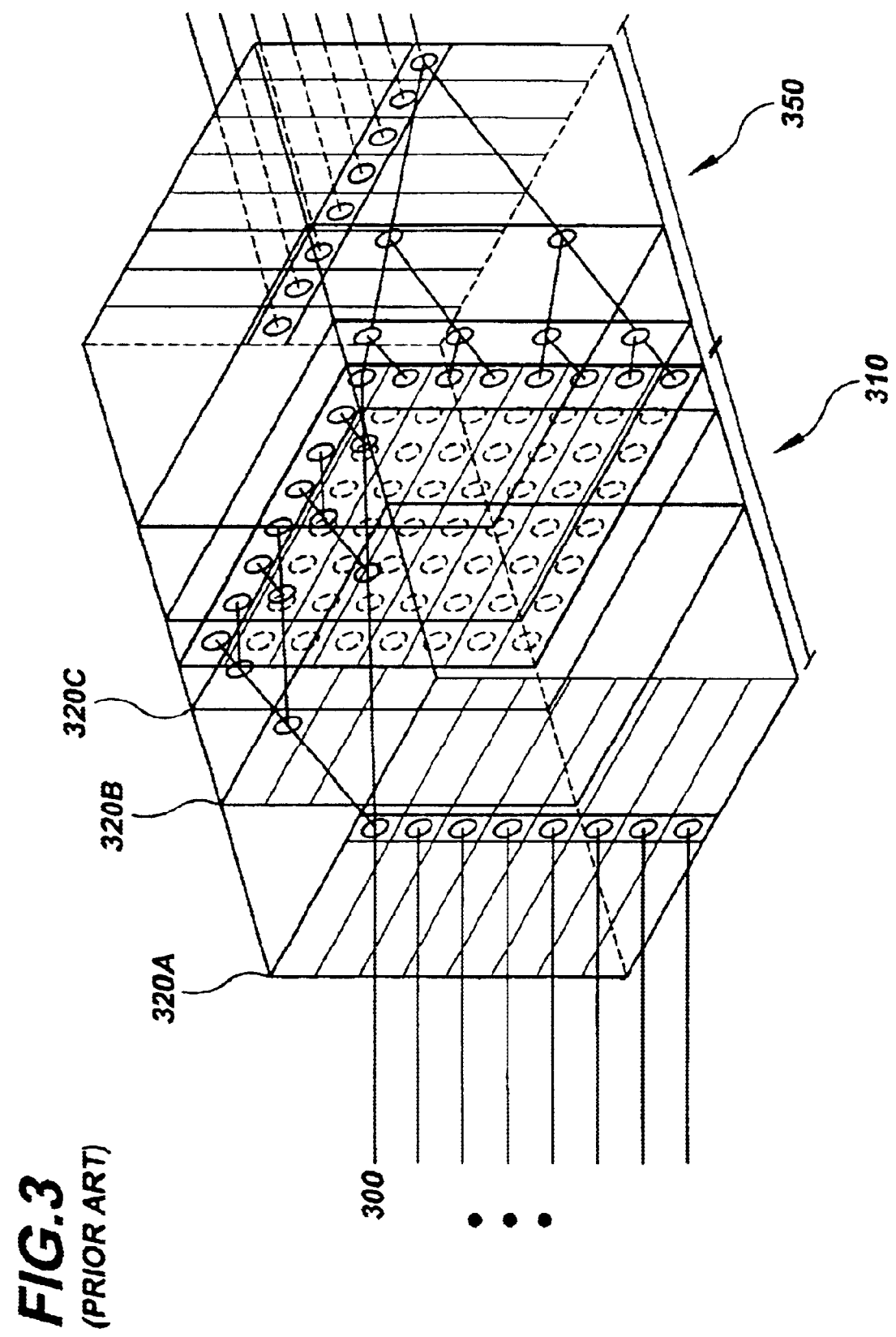
FIG. 3 is a diagram of a prior art optical router constructed from two modular components.
Figure 4A:
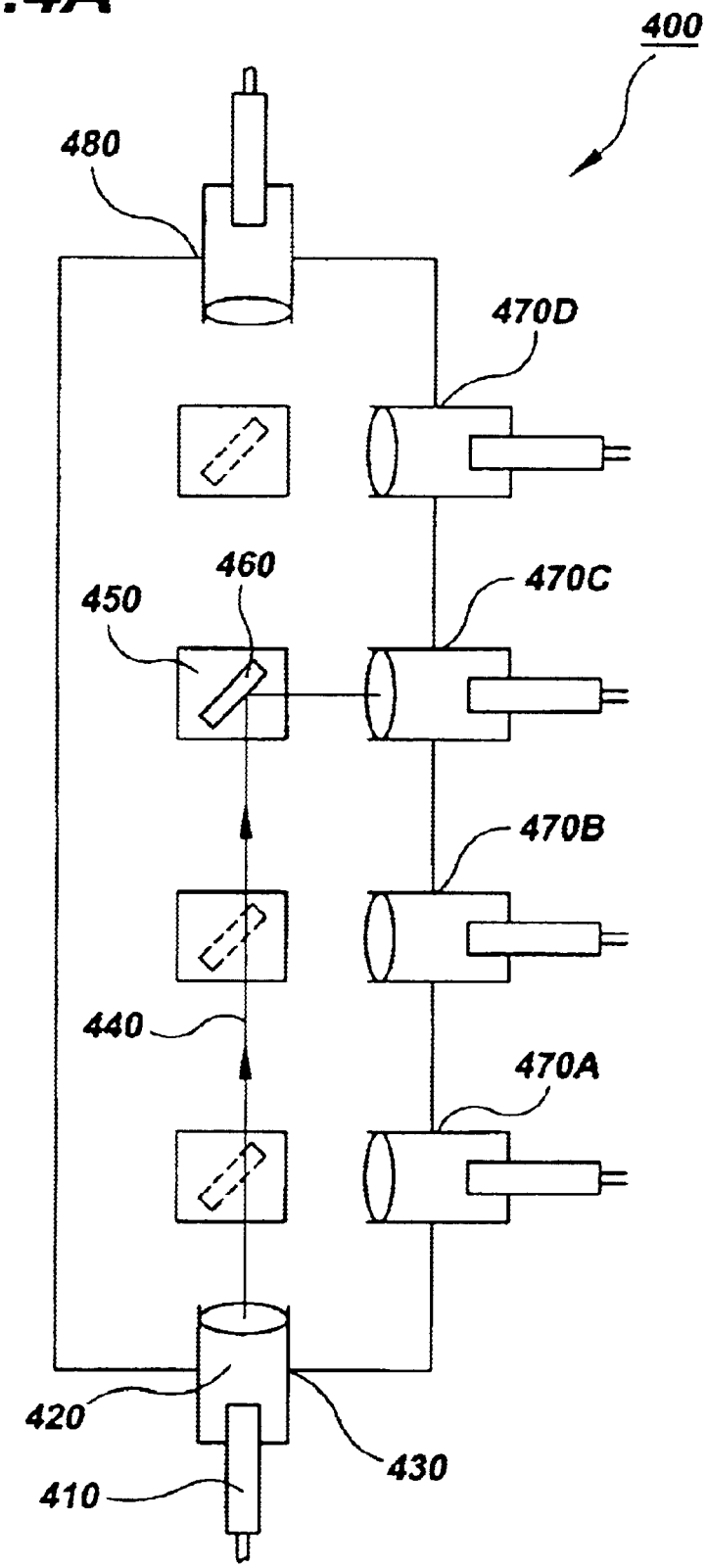
FIG. 4A is a top elevation view of the inside of a basic modular optical component according to a preferred embodiment of the present invention.

FIG. 4A is a top elevation view of the inside of a basic modular optical component 400 according to a preferred embodiment of the present invention. Although this module is 1×4, this size is merely for exemplary purposes: a basic module component according to the present invention could be made to any size 1×N. Optic Fiber 410 is attached to Collimator Assembly 420, which is engaged in Input/Output (I/O) Port 430. Platform 450 contains Mirror 460 which is in the ON position. The mirrors in the other three platforms are in the OFF position (as indicated by the doted lines). When in the ON position, any of the mirrors is interposed in the path of any light beam traversing the platform of the mirror. These mirrors may be moved by MEMs or NEMS (nanoelectromechamcal system) actuators contained in the platform. Although shown "underneath" the light beam path in FIG. 4A, the platforms and actuators may be positioned in any location within Module 400, as long as they remain out of the light beam path when not activated. Furthermore, the manner of activating the mirror may be different in different embodiments, e.g., one embodiment might use a two-axis tilting micromirror which pops up when activated and lies flat when not, another embodiment may use gimbaled micromirror, etc., as is known to one skilled in the art. Furthermore, other embodiments may use bubble technology or prisms rather than mirrors to route incoming light beams.

In FIG. 4A, incoming Light Beam 440 enters through I/O Port 430 from Optic Fiber 410, is reflected off of Mirror 450, and then exits the Module 400 through I/O Port 470C. If none of the mirrors in Module 400 are activated, input Light Beam 440 would proceed to the end of Module 400 and exit out through 110 Port 480. In FIG. 4A, Module 400 is performing as a demultiplexer (DEMUX), routing one input light beam (Beam 440) to one of many output ports (I/O Ports 470A–D). Module 400 can perform as a multiplexer (MUX) as well, where a light beam enters one of I/O Ports 470A–D and exits out of I/O Port 430. Although the light beams in Module 400 make a 90° angle when reflected off of any of the mirrors, other embodiments can form different angles, as may be necessitated by the actuating means of the mirrors (or the bubbles). In an embodiment where a non-90° angle is formed, other modules and the connectors would need to be constructed differently, as will become clear from the discussion below.

The modular interlocking nature of the inventive system is shown in the top elevation view of the inside of Module 400 shown in FIG. 4B. In FIG. 4A, Collimator Assemblies (with their attached fiber optics) are shown locked into the I/O Ports of Module 400. In FIG. 4B, the Collimator Assemblies of FIG. 4A have been removed from Module 400, exposing the empty sockets of the 110 Ports 470A–D, 480, and 430. Furthermore, Connectors 490A–F are shown poised outside of 110 Ports 470A–D, 480, and 430.

Connectors 490A–F are the means by which different modules according to the preferred embodiment are connected together to form larger switches, routers, or other devices. Connectors 490A–F may be hollow tubes for light beams to propagate in free space, or may contain one or more collimating lenses, or may contain solid or liquid material that matches other solid or liquid material used as a waveguide inside the module. Connectors 490A–F may attach and detach from the I/O Ports by any locking means, such as threading (like a screw), a post- or tab-locking system (like an Ethernet cable plug), friction, etc. In other embodiments, there may be no Connectors. In such embodiments, there would be modules that appear as Module 400 in FIG. 4A, but the Collimator Assemblies would be permanently affixed, and integral with, Module 400, and there would be other modules that appear as Module 400 in FIG. 4B, where the 110 Ports could receive and lock in the permanently attached Collimator Assemblies of the FIG. 4A module. Connectors can be formed where one end "plugs" into a module and an optical fiber "plugs" into the other end, or where the connector itself is permanently attached to an optical fiber, thereby becoming a "plug". Other embodiments may use other forms (known to those skilled in the art) of connecting elements which contain waveguides and lightpaths.

Figure 4C:
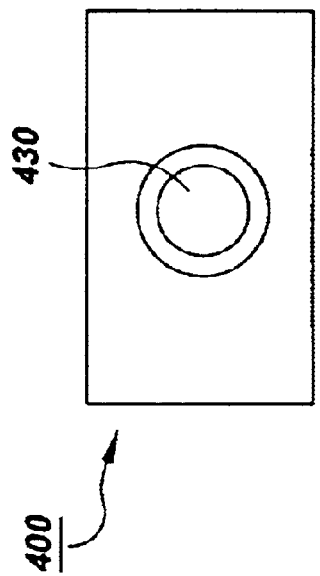
FIG. 4C is side view of the outside of the basic modular optical component of FIG. 4A, without I/O Port 430 being engaged, according to a preferred embodiment of the present invention.
Figure 4D:
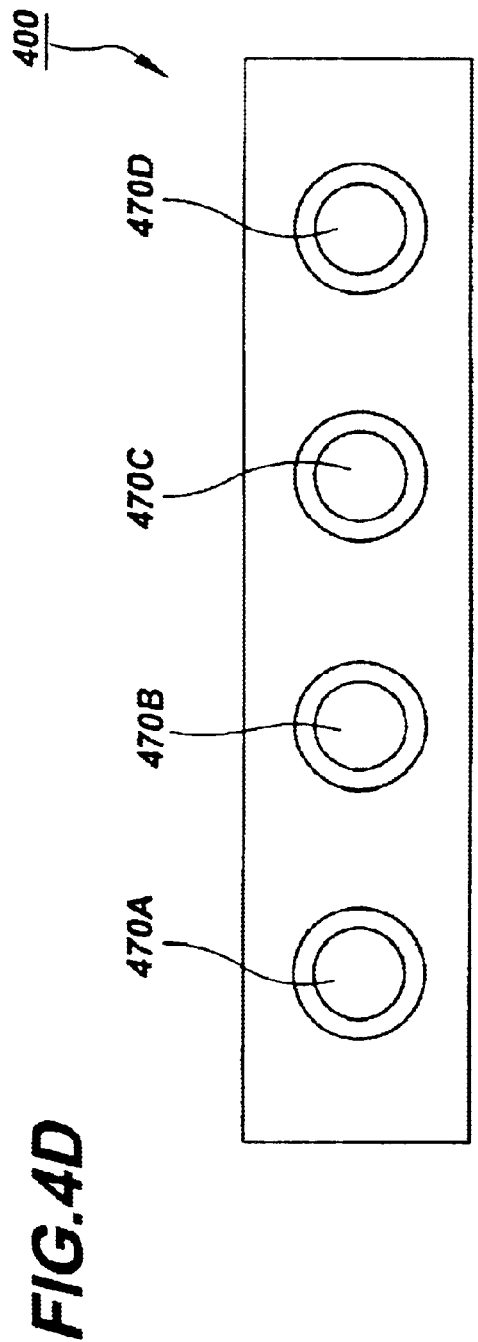
FIG. 4D is another side view of the outside of the basic modular optical component of FIG. 4A, without I/O Ports 470A–D being engaged, according to a preferred embodiment of the present invention.

FIG. 4C is side view of the outside of Module 400 looking at I/O Port 430 (which is shown empty). FIG. 4D is a side view of the outside of Module 400 looking at I/O Ports 470A–D (which are shown empty).

Figure 5A:
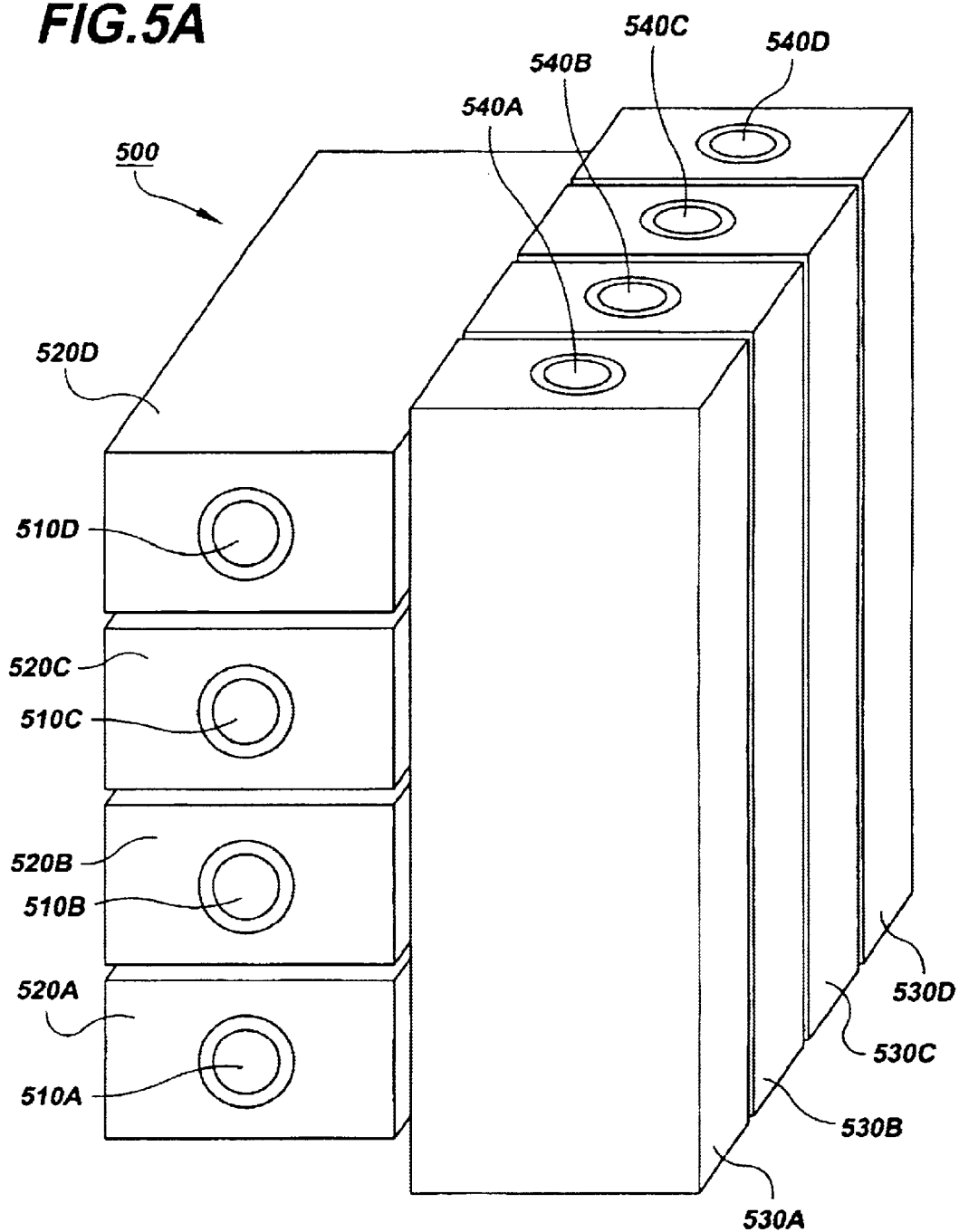
FIG. 5A is the side perspective view of a 4×4 optical router constructed by connecting four FIG. 4 modules according to a preferred embodiment of the present invention.
Figure 5B:
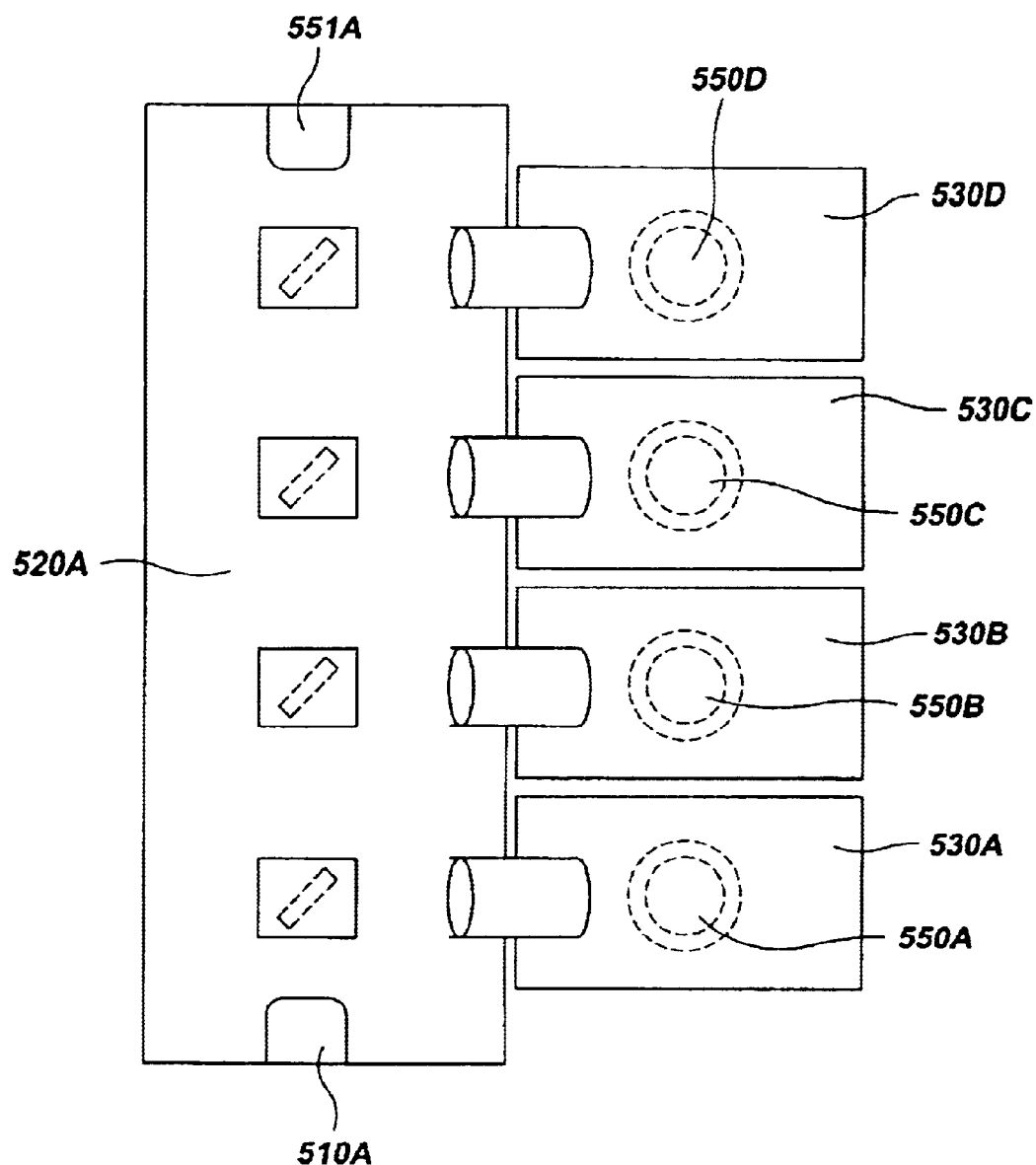
FIG. 5B is a top exposed view of the bottom layer of the 4×4 optical router in FIG. 5A, according to a preferred embodiment of the present invention.

FIGS. 5A and 5B are views of a 4×4 optical router 500 constructed by attaching eight (8) Module 400s from FIG. 4 according to a preferred embodiment of the present invention. FIG. 5A is a side perspective view of the constructed 4×4 optical router 500 facing four (4) separate I/O Ports 510A–D of four (4) separate 1×4 Modules 520A–D. Modules 510A–D have their "side" I/O Ports (not shown in FIG. 5A) attached to the "side" ports (also not shown in FIG. 5A) of Modules 530A–D. In FIG. 5A, Modules 530A–D, which are placed "on end" in comparison to Modules 520A–D, have I/O Ports 540A–D, respectively, showing on the top of 4×4 optical router 500. With this construction, any light beam input to any of I/O Ports 510A–D can be output to any of I/O Ports 540A–D (and vice-versa). Furthermore, there are eight (8) additional I/O Ports (on the sides not shown in the perspective view of FIG. 5A) which could be used for an add/drop configuration.

FIG. 5B is a top exposed view of the bottom layer of the 4×4 optical router in FIG. 5A. The bottom layer comprises 1×4 Module 520A and the bottoms of "on end" 1×4 Modules 530A–D. Thus, I/O Ports 550A–D and 551A, which cannot be seen in FIG. 5A, can be seen in FIG. 5B.

Figure 6:
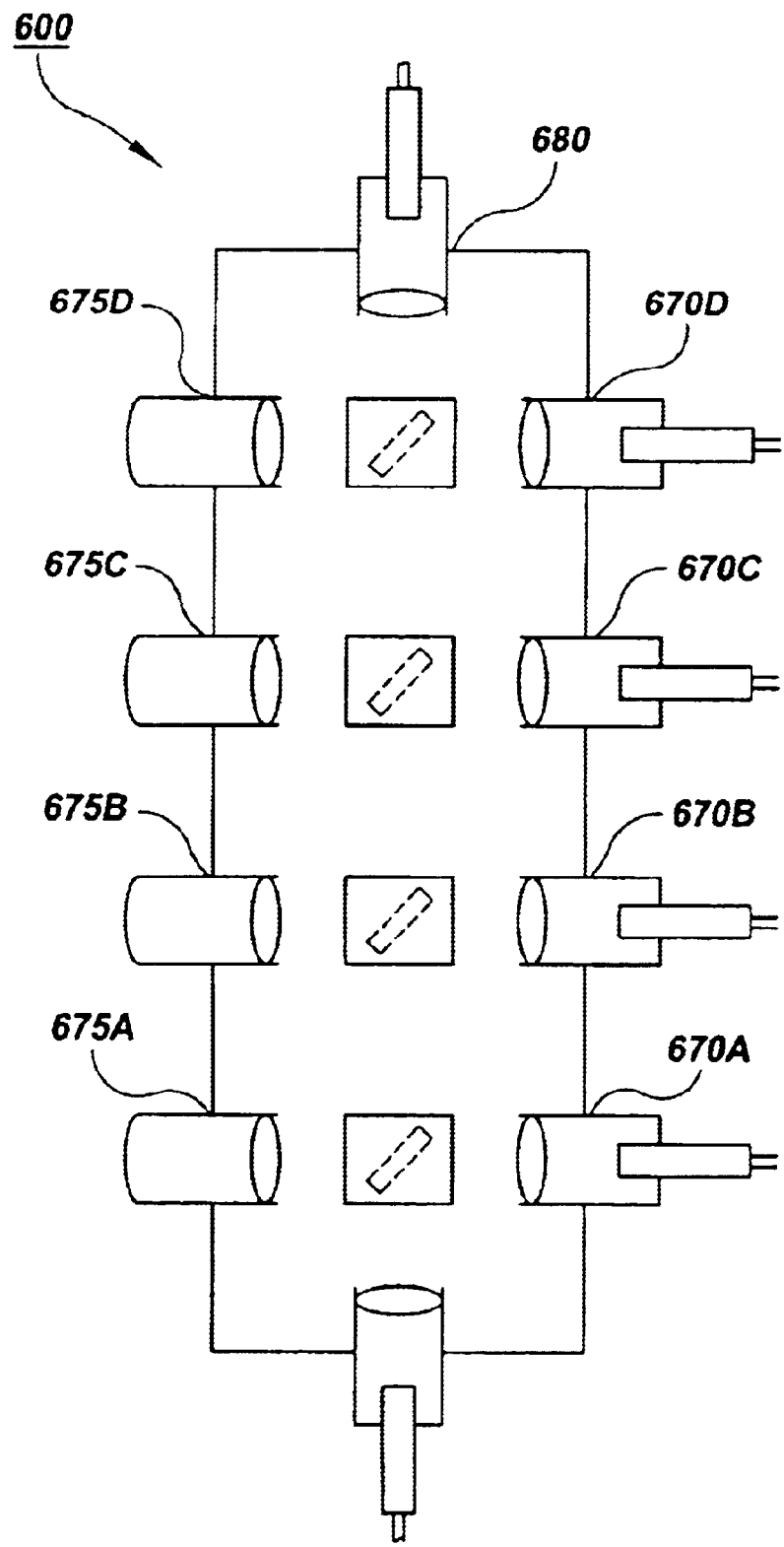
FIG. 6 is a top view of the inside of a pass-through optical component according to a preferred embodiment of the present invention.

FIG. 6 is a top view of the inside of a "pass-through" module according to a preferred embodiment of the present invention. Pass-through Module 600 has a total of 10 I/O Ports (rather than the 6 I/O Ports of Basic Module 400) which allows any light beam entering I/O Ports 670A–D to pass through and exit through I/O Ports 675A–D, unless deflected by a mirror in the ON position. Although shown with optical fibers connected to collimator assemblies in I/O Ports 670A–D, 680, and 630 on the right-hand side, top, and boom, respectively, and just connectors in I/O Ports 675A–D on the left-hand side, any connectable element may be used in those I/O ports. The pass-through optical module may be used as a photopic router to an individual home. In such an embodiment, multiple optical line, which are running past the individual home, are input through input I/O Ports 675A and exit through I/O Ports 670A–D. Using pass-through Module 600, the signal on any of the optical lines running past a location may be routed to that location.

Figure 7:
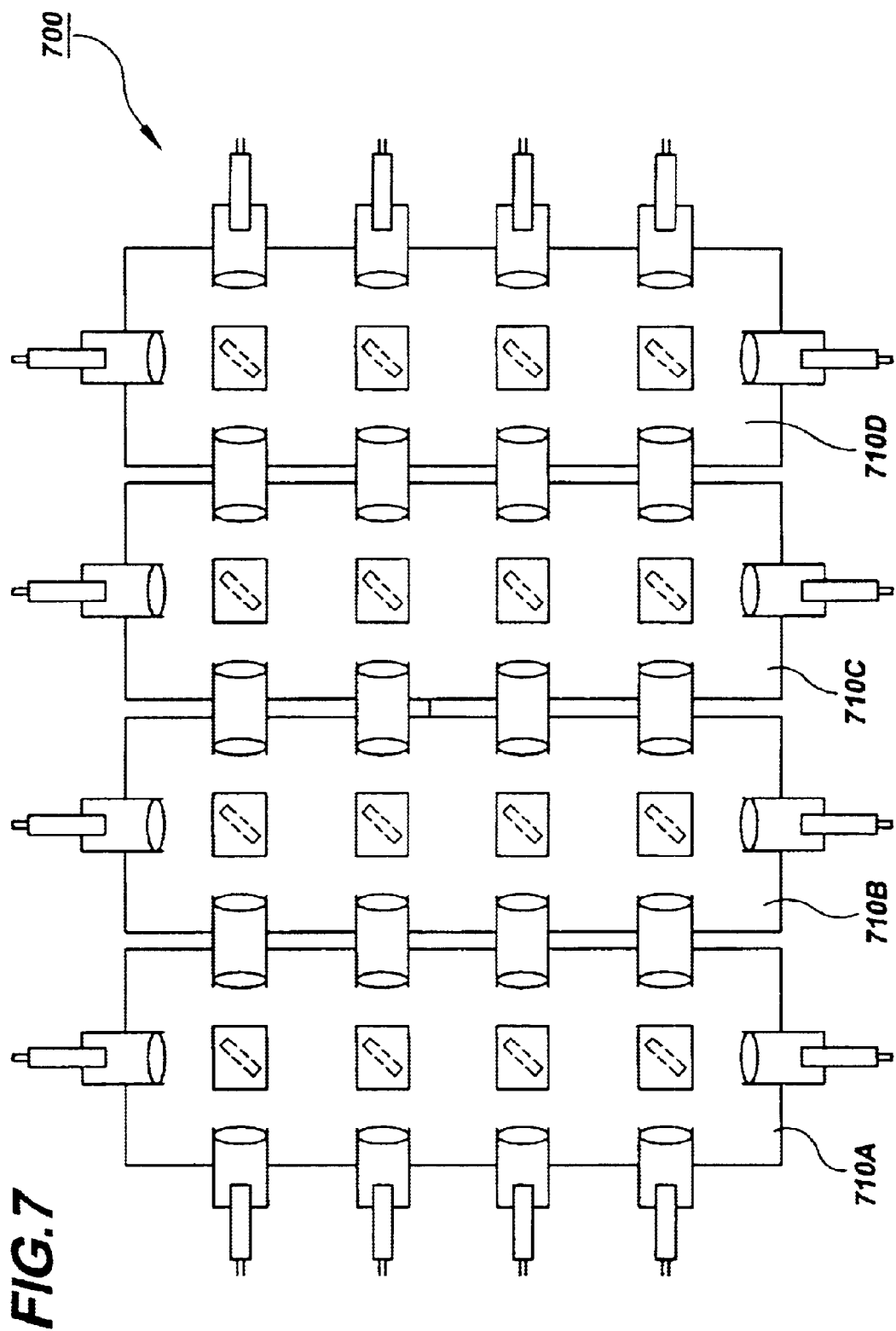
FIG. 7 is a top view of the inside of a 4×4 cross-connect switch constructed by attaching four pass-through modules from FIG. 6 according to a preferred embodiment of the present invention.

FIG. 7 is a top view of the inside of a 4×4 cross-connect switch 700 constructed by attaching four (4) Pass-through Module 710A–D from FIG. 6 according to a preferred embodiment of the present invention. The workings of such a cross-connect switch are clear in light of the previous description to one skilled in the art.

The exemplary constructions of FIGS. 5A–B and 7 give an idea of the flexibility of an optical router construction system according to a preferred embodiment of the present invention. As stated above, the 1×4 size of the modules in the exemplary constructions were used for the ease and clarity of presentation, and are not meant to be limiting. Any basic (or pass-through) module can be any size 1×N within the limits of the waveguide being used. In other words, if the modules use free space as a waveguide, the size of the modules would be limited by path loss; whereas, if the modules used a liquid or solid waveguide (e.g., in combination with bubble technology), the modules can reach much larger sizes.

Figure 8:
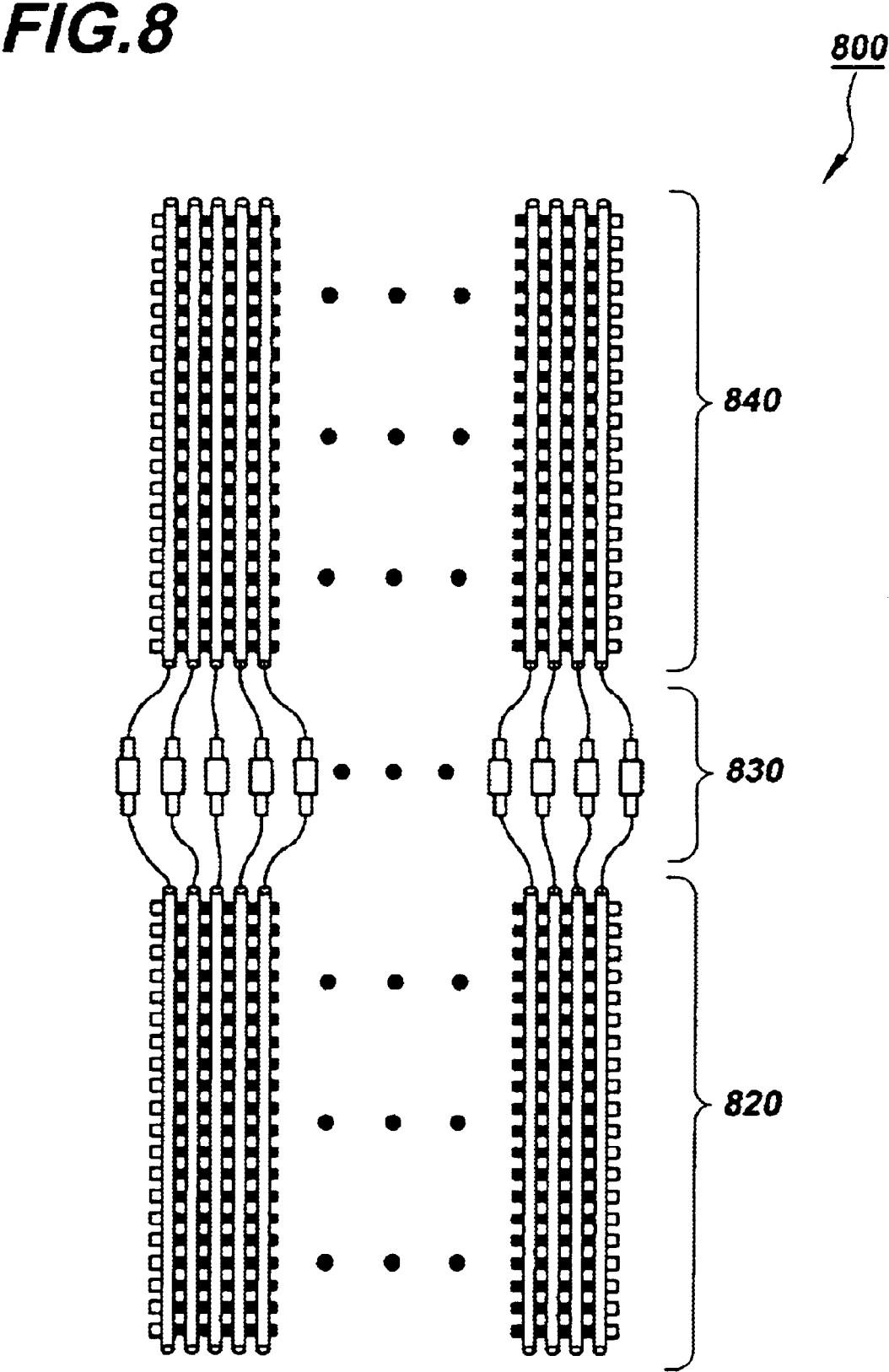
FIG. 8 is a top view of a 40×40 cross-connect switch constructed from 80 basic 1×20 optical components according to a preferred embodiment of the present invention.

Furthermore, even if free space is used as the waveguide in the modules, the size of the constructed optical router could be increased indefinitely by using o-e-o (optical-electrical-optical) repeaters which boost optical signals by converting the optical signal into an electrical signal, boosting it, and then converting it back to an optical signal. These repeaters could be placed at appropriate spots between modules or at the entrance, or exit, of a router/switch constructed from modules. For example, FIG. 8 is a top view of a 40×40 cross-connect switch 800 constructed from 80 1×20 modules, such as module 801. Between the forty (40) 1×20 modules 820 on the bottom of the page and the forty (40) 1×20 modules 840 on the top of the page are forty (40) o-e-o repeaters 830 for boosting the signals that traverse to the top forty (40) modules 840. Such o-e-o repeaters could also be placed asymmetrically within a constructed array of modules. For instance, consider a 32×=cross-connect switch constructed from thirty (32) rows of four (4) 1×8 modules connected end to end, where the light beams enter at the bottom of each row. O-e-o repeaters could be placed between the top 1×8 module and the second-from-the-top 1×8 module in each row, so that only sufficiently weakened signals are boosted. Furthermore, the present invention is not limited to o-e-o repeaters—any means for boosting an optical signal could be used.

Figure 9:
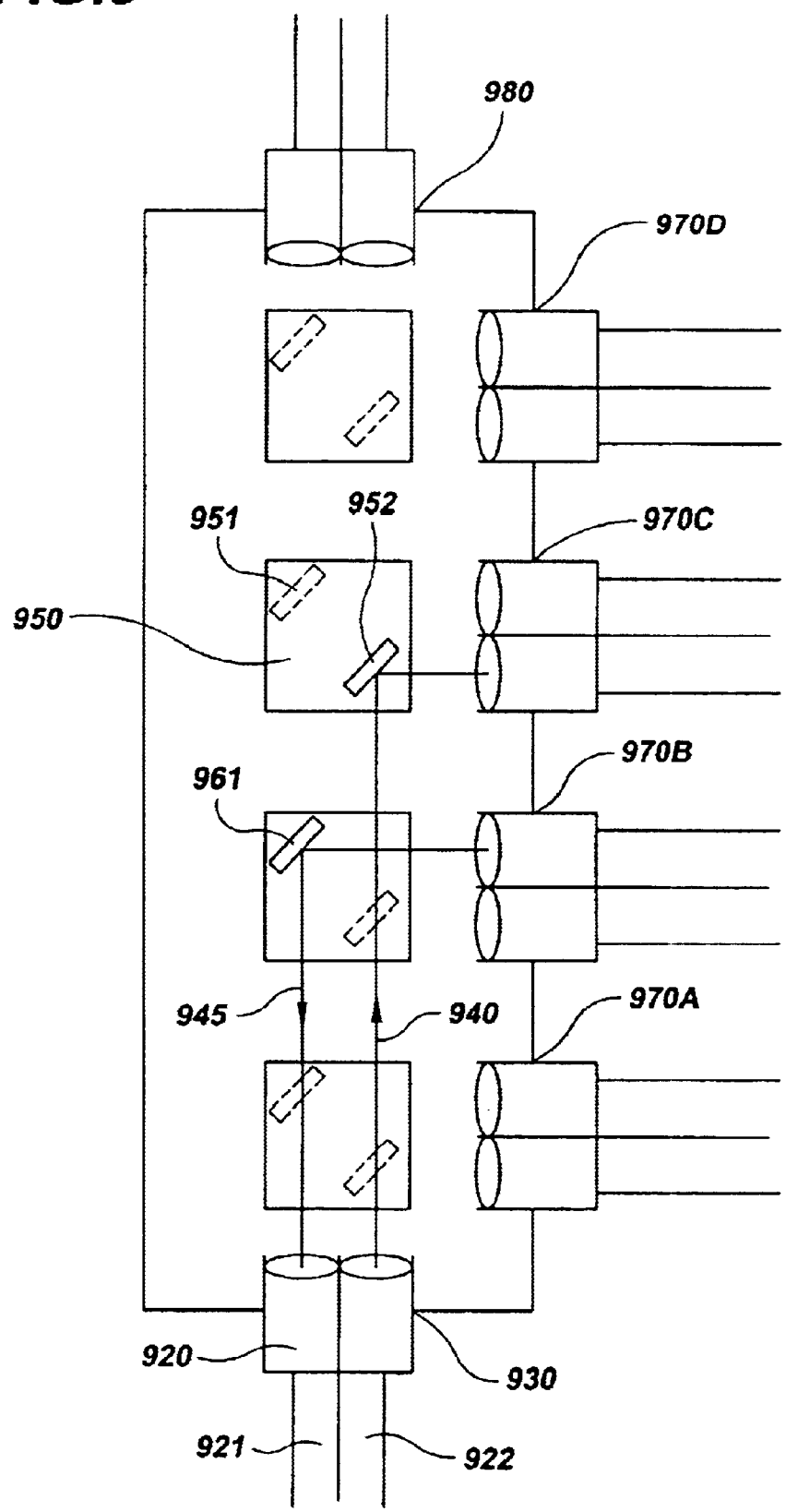
FIG. 9 is a top exposed view of a bidirectional optical component according to a preferred embodiment of the present invention.

In another aspect of the present invention, the modules are implemented so that the links connected to modules are duplex. One example of an optical fiber network using duplex links is Fibre Channel. FIG. 9 is a top exposed view of a 1×4 Module 900 with a duplex (bi-directional) structure according to a preferred embodiment of the present invention. Although Module 900 is 1×4, this size is merely for exemplary purposes: a bidirectional module component according to the present invention could be made to any size 1×N. In FIG. 9, Bi-directional Module 900 has I/O Ports 930, 970A–D, and 980. Each link has an input fiber and an output fiber. For example, Connector 920 is attached to Input Fiber 921 and Output Fiber 922. Each platform has two mirrors, one for each light path. For example, Platform 950 contains Mirror 951 and Mirror 952, which is in the ON position. When in the ON position, any of the mirrors is interposed in the appropriate input or output light path. In a manner similar to uni-directional Module 400, any reflective technology, e.g., mirror, prism or bubble technology, may be used in various embodiments. Although shown "underneath" the light beam path in FIG. 9, the platforms and actuators may be positioned in any location within Module 900; moreover, there may be a separate platform for each mirror. For instance, one mirror may extend from the ceiling (above the light beams in FIG. 9), while the other mirror extends from the floor (below the light beams in FIG. 9). Such a construction would have the advantage of the light beams never crossing paths, and would require the connectors to hook up to the module differently than shown in FIG. 9 (namely, the two collimator assemblies would not be side-by-side, but one-on-top-of-the-other).

In FIG. 9, incoming Light Beam 940 enters through I/O Port 930 from Optic Fiber 922, is reflected off of Mirror 952, and then exits Module 900 through the output fiber of the link connected to I/O Port 970C. On the other hand, incoming Light Beam 945 enters through I/O Port 970B, is reflected off of Mirror 961, and then exits Module 900 through Input Fiber 951. Thus, Module 900 is performing as both a DEMUX, routing one input light beam (Beam 940) to one of many output ports (I/O Ports 970A–D) and a MUX, routing one input light beam (Beam 945) from one of many output ports (I/O Ports 970A–D) to a single output port (I/O Port 930). Although the light beams in Module 900 make a 90° angle when reflected off of any of the mirrors (in a similar manner as Module 400), other embodiments can form different angles, as may be necessitated by the actuating means of the mirrors (or the bubbles).

As can be seen above, the modular optical router system according to the present invention has many advantages, including, but not limited to, the following. First, the modular system can be used to put together an optical router with any arbitrary number of input ports and output ports. Second, the modules can come in standard sizes, e.g., 1×10, 1×20, thereby reducing costs in the manufacturing of components and the building of modular optical routers. Third, if a portion of modular optical router malfunctions or becomes defective, only the malfunctioning/defective optical component(s) will need to be replaced (instead of the entire router). Fourth, unlike modular systems in the prior art (such as Stone), the size of the constructed optical router does not increase exponentially as the number of I/O ports increase.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A scalable optical router/switch comprising:
   a plurality of basic 1×N+1 optical components, wherein N is an integer greater than 1, wherein each basic 1×N+1 optical component comprises at least N+2 input/output (I/O) ports, wherein at least one I/O port on each basic 1×N+1 optical component is detachably connectable to at least one I/O port on another basic 1×N+1 optical component, said plurality of optical components being interconnected to each other by their I/O ports to form the scalable optical router/switch, said plurality of optical components being further capable of interconnection by stacking one basic 1×N+1 component upon another, and wherein the at least N+2 I/O ports on each basic 1×N+1 optical component comprise:
   a primary I/O port;
   a plurality of secondary I/O ports; and
   a tertiary I/O port positioned directly opposite said primary I/O port such that any light beam input through said primary I/O port and propagating unobstructed through the interior of the 1×N+1 optical component will be output through said tertiary I/O port.

2. The scalable optical router/switch of claim 1, wherein each basic 1×N+1 optical component comprises:
   a plurality of reflecting means, wherein each of said plural reflecting means has a corresponding secondary I/O port, wherein each of said plural reflecting means is either in an ON state or an OFF state, wherein a reflecting means in the ON state either reflects a light beam input through said primary I/O port such that the light beam is output through the corresponding secondary I/O port or reflects a light beam input through the corresponding secondary I/O port such that the light beam is output through said primary I/O port;
   wherein any light beam input through said primary I/O port will be output through said tertiary I/O port if none of said plurality of reflecting means are in the ON state.

3. The scalable optical router/switch of claim 2, wherein each of the plural reflecting means comprises one of:
   a mirror which is moved by an actuator to affect the ON and OFF states;
   a prism which is moved by an actuator to affect the ON and OFF states; or
   a bubble which is produced and destroyed by bubble technology to affect the ON and OFF states.

4. The scalable optical router/switch of claim 1, wherein the plurality of basic 1×N+1 optical components comprises at least one of: a 1×2 optical component, a 1×4 optical component, a 1×8 optical component, a 1×16 optical component, and a 1×32 optical component.

5. The scalable optical router/switch of claim 1, further comprising:
   a plurality of connecting means for affecting detachable connections between basic 1×N+1 optical components, wherein each connecting means comprises two distal end portions and at least one of the two distal end portions is capable of detachably connecting to an I/O port.

6. The scalable optical router/switch of claim 5, wherein one distal end of each connecting means is integral with an I/O port.

7. The scalable optical router/switch of claim 5, wherein one distal end of each connecting means is one of capable of: being detachably connected to an optical fiber, or permanently connected to an optical fiber.

8. The scalable optical router/switch of claim 1, further comprising:
   at least one pass-through optical component, wherein each pass-through optical component comprises at last 2N+2 I/O ports, wherein N is an integer greater than 1, wherein at least one I/O port on each pass-through optical component is detachably connectable to at least one I/O port on another pass-through optical component and/or basic 1×N+1 optical component, and wherein each pass-through optical component comprises:

a primary I/O port;
a plurality of N secondary I/O ports;
a tertiary I/O port;
a plurality of N quaternary I/O ports; wherein each of said plural quaternary I/O ports has a corresponding secondary I/O port; and
a plurality of reflecting means, wherein each of said plural reflecting means has a corresponding secondary I/O port, wherein each of said plural reflecting means is either in an ON state or an OFF state, wherein a reflecting means in the ON state either reflects a light beam input through said primary I/O port such that the light beam is output through the corresponding secondary I/O port or reflects a light beam input through the corresponding secondary I/O port such that the light beam is output through said primary I/O port;
wherein said tertiary I/O port is positioned such that any light beam input through said primary I/O port will be output through said tertiary I/O port if none of said plurality of reflecting mews are in the ON state; and
wherein each of said plural quaternary I/O ports is positioned such that any light beam input through the corresponding secondary I/O port will be output through the quartary I/O port if none of said plurality of reflecting means are in the ON state;
wherein at least two optical components from the group comprised of at least one said basic 1×N+1 optical component and at least one said pass-through optical component are interconnected to each other by then I/O ports to form the scalable optical router/switch.

9. A method of modular optical component construction for assembling a scalable optical route/switch comprising the steps of:
providing a plurality of basic 1×N+1 optical components, wherein N is an integer greater than 1, wherein each basic 1×N+1 optical component comprises at least N+2 input/output (I/O) ports, wherein at least one I/O port on each basic 1×N+1 optical component is detachably connectable to at least one I/O port on another basic 1×N+1 optical component, wherein said plurality of optical components is further capable of interconnection by stacking one basic 1×N+1 optical component upon another, and wherein the at least N+2 I/O ports on each basic 1×N+1 optical component comprise:
a primary I/O port;
a plurality of secondary I/O ports; and
a tertiary I/O port positioned directly opposite said primary I/O port such that any light beam input through said primary I/O port and propagating unobstructed through the interior of the 1×N+1 optical component will be output through said tertiary I/O port; and
interconnecting said plurality of optical components to each other by at least one of stacking them and connecting their I/O ports to form the scalable optical router/switch.

10. The construction method of claim 9, wherein each basic 1×N+1 optical component comprises:
a plurality of reflecting means, wherein each of said plural reflecting means has a corresponding secondary I/O port, wherein each of said plural reflecting means is either in an ON state or an OFF state, wherein a reflecting means in the ON state either reflects a light beam input rough said primary I/O port such that the light beam is output through the corresponding secondary I/O port or reflects a light beam input through the corresponding secondary I/O port such that the light beam is output through said primary I/O port;
wherein any light beam input through said primary I/O port will be output through said tertiary I/O port if none of said plurality of reflecting means are in the ON state.

11. The construction method of claim 10, wherein the plural reflecting means comprises at least one of:
mirrors which are moved by actuators to affect the ON and OFF states;
prisms which are moved by actuators to affect the ON and OFF states; or
bubbles which are produced and destroyed by bubble technology to affect the ON and OFF states.

12. The construction method of claim 9, further comprising the step of:
providing a plurality of connecting means for affecting detachable connections between basic 1×N+1 optical components, wherein each connecting means comprises two distal end portions and at least one of the two distal end portions is capable of detachably connecting to an I/O port.

13. A bidirectional optical component capable of modular construction comprising:
a primary input/output (I/O) port capable of engaging a duplex optical link comprised of a first optical fiber for signals propagating in a first direction and a second optical fiber for signals propagating in the second direction;
a plurality of N secondary I/O ports capable of engaging a duplex optical link;
a tertiary I/O port capable of engaging a duplex optical link; and
a plurality of sets of reflecting means, wherein each said set of reflecting means has a corresponding secondary I/O port; and each said set of reflecting means comprises:
a first reflecting means for being either an ON state or an OFF state, wherein said first reflecting means is in the ON state, a light beam input from the first optical fiber of said primary I/O port is reflected such that the light beam is output through the second optical fiber of the corresponding secondary I/O port;
a second reflecting means for being either in an ON state or an OFF state, wherein, when said second reflecting means is in the ON state, a light beam input from the second optical fiber of the corresponding secondary I/O port is reflected such that the light beam is output through the first optical fiber of said primary I/O port;
wherein said tertiary I/O port is positioned such that any light beam input from the first optical fiber of said primary I/O port will be output through the second optical fiber of said tertiary I/O port if none of said plural first reflecting means are in the ON state.

14. The bi-directional optical component of claim 13, wherein each of the plural first and second reflecting means comprise at least one of:
a mirror which is moved by actuators is to affect the ON and OFF states;
a prism which is moved by actuators to affect the ON and OFF states; or
a bubble which is produced and destroyed by bubble technology to affect the ON and OFF states.

15. The scalable optical router/switch of claim 1, wherein the primary I/O port is positioned on a first side of the basic 1×N+1 optical component, the plural secondary I/O ports are positioned on a second side of the basic 1×N+1 optical component different from said first side, and the tertiary I/O port is positioned on a third side of the basic 1×N+1 optical component, and wherein said third side of the basic 1×N+1 optical component is opposite to said first side of the basic 1×N+1 optical component.

16. The scalable optical router/switch of claim 15, wherein each of the plural secondary I/O ports are located a certain horizontal distance from each other on the second side of the 1×N+1 basic optical component, wherein, when a first basic 1×N+1 optical component is stacked upon a second basic 1×N+1 optical component, each of the primary, secondary, and tertiary I/O ports of the first basic 1×N+1 optical component are located a certain vertical distance from the corresponding primary, secondary, and tertiary I/O ports of the second basic 1×N+1 optical component, and wherein said certain horizontal distance is substantially the same as the certain vertical distance.

17. The scalable optical router/switch of claim 16, wherein at least two basic 1×N+1 optical components are stacked, and wherein an unstacked basic 1×N+1 optical component is positioned such that its secondary I/O ports were connected to one of the primary, secondary, or tertiary I/O ports of the stacked basic 1×N+1 optical components.

18. A pass-through optical component comprising:
   a primary I/O port;
   a plurality of M secondary input ports, wherein M is an integer greater than 1;
   a plurality of M secondary output ports; wherein each of said plural secondary input ports has a corresponding secondary output port; and
   a plurality of reflecting means, wherein each of said plural reflecting means has a corresponding secondary input port, wherein each of said plural reflecting means is either in an ON state or an OFF state, wherein a reflecting means in the ON state reflects a light beam input through said secondary input port such that the light beam is output through the primary I/O port;
   wherein the plural secondary input and output ports are positioned such that any light beam input through a secondary input port will be output through the corresponding secondary output port if none of said plurality of reflecting means are in the ON state.

19. The pass-through optical component of claim 18, further comprising:
   a tertiary I/O port, wherein said tertiary I/O port is positioned such that any light beam input through said primary I/O port will be output through said tertiary I/O port if none of said plurality of reflecting means are in the ON state, wherein the tertiary I/O port of one pass-through optical component is detachably connectable to the primary I/O port of another pass-through optical component;
   wherein the tertiary I/O port of the pass-through optical component may be connected to a primary I/O port of another pass-through optical component to form a pass-through optical component capable of receiving 2M input optical feeds.

20. The pass-through optical component of claim 18, wherein the pass-through optical component may be stacked upon another pass-through optical component to form a larger pass-through optical component having two primary I/O ports.

21. The pass-through optical component of claim 18, wherein at least one secondary port on the pass through optical component is detachably connectable to at least one secondary port on another pass-through optical component, and wherein the two pass-through optical components may be interconnected to form a larger optical component.

* * * * *